United States Patent
Shepard

(10) Patent No.: US 9,214,276 B2
(45) Date of Patent: Dec. 15, 2015

(54) CAPACITOR

(75) Inventor: Charles Patrick Shepard, DeKalb, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 768 days.

(21) Appl. No.: 13/351,044

(22) Filed: Jan. 16, 2012

(65) Prior Publication Data

US 2013/0182372 A1    Jul. 18, 2013

(51) Int. Cl.
| | | |
|---|---|---|
| H01G 2/08 | (2006.01) | |
| H01G 2/10 | (2006.01) | |
| H01G 4/32 | (2006.01) | |
| H01G 4/18 | (2006.01) | |

(52) U.S. Cl.
CPC .............. *H01G 2/08* (2013.01); *H01G 2/106* (2013.01); *H01G 4/18* (2013.01); *H01G 4/32* (2013.01); *Y10T 29/49826* (2015.01)

(58) Field of Classification Search
CPC ........... H01G 2/08; H01G 2/106; H01G 4/32; H01G 4/18
USPC ............................. 361/274.3, 274.1, 307, 323
See application file for complete search history.

(56) References Cited

U.S. PATENT DOCUMENTS

| | | | |
|---|---|---|---|
| 3,106,687 A | | 10/1963 | Bowman |
| 3,221,217 A | * | 11/1965 | Hucke .......................... 361/539 |
| 3,541,405 A | | 11/1970 | Oeschger |
| 3,543,215 A | * | 11/1970 | Jones .............................. 439/82 |
| 3,622,846 A | * | 11/1971 | Reimers ..................... 361/274.3 |
| 3,725,631 A | | 4/1973 | Angelucci et al. |
| 3,912,987 A | | 10/1975 | Sargent |
| 4,345,298 A | * | 8/1982 | Grahame ...................... 361/273 |
| 4,547,832 A | * | 10/1985 | Lavene ........................ 361/307 |
| 4,719,539 A | * | 1/1988 | Lavene ........................ 361/307 |
| 4,868,974 A | | 9/1989 | Nishiguchi |
| 4,940,429 A | * | 7/1990 | Chambers et al. ........ 439/607.17 |
| 4,982,376 A | * | 1/1991 | Megens et al. ................ 361/760 |
| 5,001,597 A | * | 3/1991 | Stockman .................. 361/306.1 |
| 5,032,809 A | | 7/1991 | Chambers et al. |
| 5,760,481 A | | 6/1998 | Murayama |
| 5,805,411 A | * | 9/1998 | Anderson .................. 361/306.1 |
| 6,430,024 B1 | * | 8/2002 | Gernert ......................... 361/302 |
| 6,782,615 B2 | | 8/2004 | Shibata et al. |
| 7,697,989 B1 | * | 4/2010 | Lim et al. ........................ 607/36 |
| 7,812,606 B2 | | 10/2010 | Burns |
| 8,022,785 B2 | | 9/2011 | Zelenz |
| 8,478,409 B2 | * | 7/2013 | Iyer et al. ........................ 607/36 |
| 2005/0060003 A1 | * | 3/2005 | Taylor et al. .................... 607/36 |

FOREIGN PATENT DOCUMENTS

JP            02028910 A    *  1/1990

* cited by examiner

*Primary Examiner* — David M Sinclair
(74) *Attorney, Agent, or Firm* — Cantor Colburn LLP

(57) ABSTRACT

A capacitor is provided having an outer shell. A capacitor film member is disposed within the outer shell. A conductor member is disposed within the outer shell in thermal contact with the capacitor film member. A collet member is slidingly coupled to the conductor member.

15 Claims, 1 Drawing Sheet

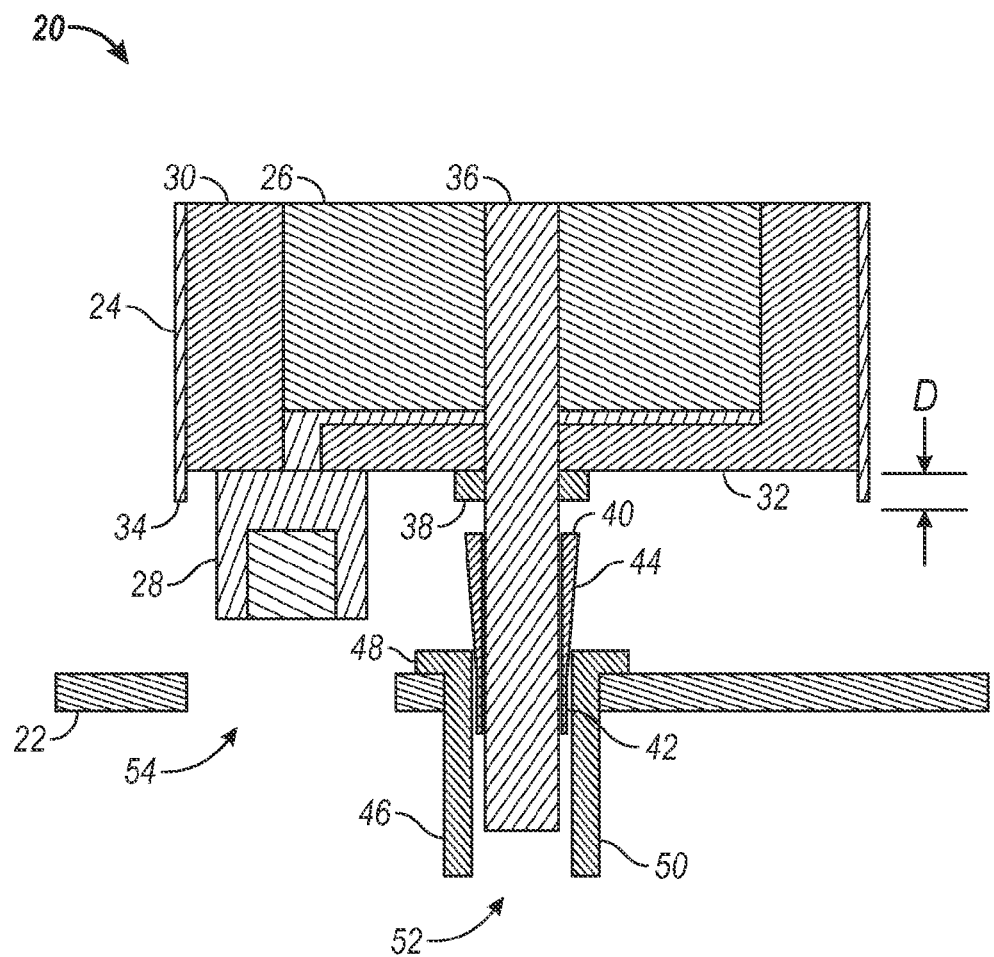

CAPACITOR

FEDERAL RESEARCH STATEMENT

This invention was made with government support under contract number FA8650-07-2-2739 awarded by the United States Air Force. The government may have certain rights in the invention.

BACKGROUND OF THE INVENTION

The present application relates to a capacitor, and in particular to a capacitor configured to transfer heat in a radial and axial direction.

Electrical and electronic applications use capacitors in many circuits for power, control and conversion. Frequently, these capacitors have a large energy storage capacity and voltage. One type of capacitor, the film capacitor, has been used in many applications such as electric power generation, conversion, and aircraft avionics.

A film capacitor has two or more layers of a dielectric material. The dielectric material is metallized by depositing metal using vacuum deposition or spray to make the material electrically conductive. The two layers are then rolled and compacted. The ends of the roll are sprayed with a metal to make the ends electrically conductive. These rolls are then placed in a housing which may be sealed with an epoxy resin.

Film capacitors may be sensitive to elevated temperatures that adversely impact the capacitors performance. As result, the film capacitor may be the temperature limiting components when used in aircraft avionics or similar applications. The location of the film capacitor within the epoxy resin may further adversely affect the ability of the film capacitor to eliminate excess heat. As the electrical power capacity increases, there is an increased need to remove excess heat from the film capacitor.

Accordingly, while existing capacitors are suitable for their intended purpose the need for improvement remains, particularly in a capacitor with an increased thermal conductivity.

BRIEF DESCRIPTION OF THE INVENTION

In accordance with one embodiment of the invention, a capacitor is provided. The capacitor includes an outer shell and a capacitor film member disposed within the outer shell. A conductor member is disposed within the outer shell in thermal contact with the capacitor film member. A collet member is slidingly coupled to the conductor member.

In accordance with another embodiment of the invention, a capacitor configured to mount to a bracket is provided. The capacitor includes an outer shell having a predetermined height. A capacitor film member is disposed within the outer shell. An epoxy layer is disposed between the capacitor film member and the outer shell. A conductor member is arranged within the outer shell in thermal contact with the capacitor film member, the conductor having a length greater than the predetermined height, wherein the conductor member extends past a first end of the outer shell. A collet is slidingly coupled to the conductor member adjacent the first end, the collet having at least a portion of an outer surface having a conical surface.

In accordance with another embodiment of the invention, a method of mounting a capacitor to a bracket is provided. The method includes the step of providing a capacitor with an outer shell, a capacitor member disposed within the shell and a conductor member disposed within the outer shell and thermally coupled to the capacitor member. A collet is arranged having a first opening sized to slidingly engage the conductor member. A sleeve is provided having a second opening sized to receive a first end of the collet. The collet is slid onto the conductor member. The collet is pressed into the sleeve.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawing in which:

FIG. 1 is a side sectional view of a capacitor in accordance with an embodiment of the invention.

DETAILED DESCRIPTION OF THE INVENTION

Capacitors are an electrical component that is used in a variety of applications such as aircraft avionics. Capacitors generate heat during operation that may need to be dissipated to avoid degradation of performance. Typically, the heat is transferred through an outer shell and dissipated into the environment. Since the capacitors dielectric material is located close to the center of the capacitor, the thermal energy generated during operation needs to transfer across the width of the capacitor before being dissipated. Embodiments of the present invention provide advantages in conducting heat simultaneously in an axial and radial direction. Embodiments of the invention provide still further advantages in conducting heat from the center of the capacitor into an adjacent bracket. Embodiments of the invention provide still further advantages in providing a method of coupling the capacitor to a bracket using a collet that allows for looser tolerancing of a thermal conductor member, which in turn reduces the cost of fabrication and assembly and increases the reliability of the thermal connection.

Referring now to FIG. 1, a capacitor 20 is shown that is coupled to a bracket 22. The capacitor 20 includes an outer shell 24. The outer shell 24 is made from a thermally conductive material that allows heat to be transferred to the environment while also providing a housing for the capacitor components. Outer shell 24 contains a film capacitor member 26. In one embodiment, the film capacitor member 26 is made from a number of film capacitor rolls, each film capacitor roll is created from a plurality of film capacitive layers, made from metalized plastic layers, which are rolled to form a film capacitor roll. Each film capacitor roll is then compacted by applying a compressive force and has metallic spray applied to its ends to form metal contacts. The film capacitor member 26 is electrically coupled to one or more terminals 28 that allow the capacitor 20 to be electrically coupled to a desired circuit.

The film capacitor member 26 is encased within the outer shell 24 by an epoxy resin 30. The epoxy resin 30 seals the film capacitor member against moisture and also facilitates thermal transfer of heat from the outer diameter of the film capacitor member 26 to the outer shell 24. A portion 32 of the epoxy resin 30 encases an end of the film capacitor member 26 adjacent an end 34 of the outer shell 24. In one embodiment, the epoxy resin portion 32 is offset a distance D from the end 34 of the outer shell 24.

The capacitor 20 further includes a conductor member 36 within the outer shell 24. In the exemplary embodiment, the conductor member 36 is made from a highly conductive material having a thermal conductivity greater than 250 k–W/(m·K), such as copper or aluminum for example. The conductor member 36 has a length that is greater than or equal to the height of the outer shell 24. The conductor member 36 is thermally coupled to the film capacitor member 26 and is centrally located within the film capacitor member 26. In the exemplary embodiment, the outer shell 24 is cylindrical and the conductor member 36 is arranged coaxial with the outer shell 24. In one embodiment, the conductor member 36 is a heat pipe.

In one embodiment, a washer member 38 having an opening with an inner diameter sized to receive and be disposed on the conductor member 36. The washer member 38 is positioned with one side against the portion 32. As will be discussed in more detail below, the washer member 38 engages a collet 40 when the capacitor 20 is pressed onto the mounting bracket 22. The washer member 38 distributes the forces when the capacitor 20 is pressed onto the bracket 22 and reduces the risk of the collet 40 damaging the epoxy resin portion 32. In one embodiment, the washer member 38 has a thickness that is smaller than the distance D such that the washer member 38 is positioned within the offset area between the end 34 and the epoxy resin portion 32 when the capacitor 20 is coupled to the bracket 22. In one embodiment, the washer member 38 is made from aluminum.

Disposed adjacent the washer member 38 is the collet 40. The collet 40 has an inner diameter sized to slidingly fit over the conductor member 36. As will be discussed in more detail below, the collet 40 is sized such that when the capacitor 20 is pressed onto the bracket 22, the collet 40 is compressed and coupled onto the conductor member 36. The collet 40 has an outer surface having a cylindrical surface 42 and a conical surface 44. In the exemplary embodiment, the collet 40 is made from aluminum. As will be discussed in more detail below, the collet 40 provides advantages in allowing larger tolerances on the conductor member 36 as the length of the conductor member 36 may vary while still ensuring that the conductor member 36 is thermally coupled to the bracket 22.

The capacitor 20 further includes a sleeve 46 having a flange 48. The sleeve 46 has a cylindrical portion 50 that is sized to fit in an opening in the bracket 22. It should be appreciated that the flange 48 is sized to support the sleeve 46 on the bracket 22 and prevent the sleeve 46 from passing through the bracket 22. The sleeve 46 further includes an opening 52 sized to receive the surface 42 and the end of the conical surface 44. As will be discussed in more detail below, the sleeve 46 cooperates with the conical surface 44 of the collet 40 to compress the collet 40 onto the conductor member 36 as the capacitor 20 is pressed onto the bracket 22. The coupling of the sleeve 46, collet 40 and conductor member 36 facilitates the transfer of heat from the film capacitor member through the conductor member and into the bracket 22.

To install the capacitor 20 on the bracket 22, the installer first places the washer member 38 onto the conductor member 36 and slides the washer member 38 against the epoxy resin portion 32. Next, the installer slides the collet 40 onto the conductor member 36, such that the end with the conical surface 44 is against or adjacent to the washer member 38. The sleeve 46 is inserted into an opening in the bracket 22. The capacitor 20 is then positioned over the bracket 22 such that the conductor member 36 and collet 40 are positioned over the opening 52 and the terminal 28 is positioned over the opening 54 in the bracket 22.

The capacitor 20 is then pressed by the installer in a direction toward the bracket 22. As the capacitor 20 is pressed, the washer member 38 engages the end of the collet 40. As the pressing is continued, the conical surface of the collet 40 is directed into the opening 52 of the sleeve 46. As the conical surface 44 is forced into the opening 52, the collet 40 is compressed clamping and coupling the conductor member 36 to the collet 40. It should be appreciated that the coupling of the conductor member 36 to the collet 40 facilitates the transfer of heat from the conductor member 36 to the collet 40. Similarly, the pressing of the collet 40 into the sleeve 46 increases the contact between the collet 40 and the sleeve 46 facilitating the transfer of heat from the collet 40 to the sleeve 46. Further still, the coupling of the collet 40 and the conductive member 36 facilitates the retaining of the capacitor 20 on the bracket 22 during assembly.

During operation, the capacitor 20 generates heat within the film capacitor member 26. This thermal energy is then transferred in two directions, radially toward the outer shell 24 and axially along the thermal conductor 36. The heat transferred to the conductor member 36 passes through the collet 40 and the sleeve 46 into the bracket 22. It should be appreciated that the conductor member 36 provides advantages in increasing the thermal transfer capacity of the capacitor 20. The conductor member 36 and collet 40 also provide advantages in increasing the efficiency of heat transfer by transferring heat from the location where the heat is generated. Further, the use of the collet 40 provides advantages in that the sizing and tolerancing of the conductor member 36 does not have to be as precise when compared with inserting and coupling the conductor member 36 directly to the bracket 22.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A capacitor comprising:
   an outer shell, having an end surface;
   a film capacitor member disposed within the outer shell;
   an epoxy layer disposed between the capacitor film member and the outer shell, the epoxy layer having an end portion offset from the end surface by a predetermined distance;
   a conductor member disposed within the outer shell in thermal contact with the film capacitor member;
   a collet member slidingly coupled to the conductor member, wherein the collet includes a first opening sized to receive the conductor member, the collet further having an outer surface with a conical surface;
   a washer member disposed between the collet and the film capacitor member, the washer member having a third opening sized to receive the conductor member, the washer member having a thickness that is smaller than the predetermined distance; and
   a sleeve having a second opening sized to receive an end of the conical surface, wherein a portion of the conical surface opposite the end is larger than the second opening,
   wherein the collet member is disposed between the sleeve and the washer member.

2. The capacitor of claim 1 wherein the outer shell has a predefined height and the conductor member has a length that is equal to or greater than the predefined height.

3. The capacitor of claim 1 wherein the outer shell is substantially cylindrical and the conductor member is disposed substantially co-axial with the outer shell.

4. The capacitor of claim 1 wherein the collet is movable from a first position to a second position, the second position being within the sleeve, the collet thermally coupling the conductor member to the sleeve.

5. The capacitor of claim 4 wherein the epoxy layer is configured to radially transfer heat from the film capacitor member to the outer shell and the conductor member is configured to axially transfer heat to the collet.

6. A capacitor configured to mount to a bracket, the capacitor comprising:
an outer shell having a predetermined height;
a film capacitor member disposed within the outer shell;
an epoxy layer disposed between the capacitor film member and the outer shell, the epoxy layer having an end portion offset from the end surface of the outer shell by a predetermined distance, the epoxy layer configured to radially transfer heat from the film capacitor member to the outer shell;
a conductor member arranged within the outer shell in thermal contact with the film capacitor member, the conductor having a length greater than the predetermined height, wherein the conductor member extends past a first end of the outer shell;
a collet slidingly coupled to the conductor member adjacent the first end, the collet having at least a portion of an outer surface having a conical surface;
a washer member slidingly coupled to the conductor member between the collet and the film capacitor member, the washer member having a third opening sized to receive the conductor member, the washer member having a thickness that is smaller than the predetermined distance; and
a sleeve having a first opening sized to receive an end of the conical surface, wherein a portion of the conical surface opposite the end is larger than the first opening,
wherein the collet member is disposed between the sleeve and the washer member.

7. The capacitor of claim 6 wherein the first opening is sized to couple the collet to the conductor member when the collet is pressed into the first opening.

8. The capacitor of claim 7 wherein the sleeve includes an outer diameter sized to be received in a second opening in the bracket, the sleeve further including a flange on one end.

9. The capacitor of claim 8 wherein the conductor member is disposed in substantially a center of the film capacitor member.

10. The capacitor of claim 9 wherein the outer shell has a center axis and the conductor member is positioned co-axial with the center axis.

11. The capacitor of claim 7 wherein the collet thermally couples the conductor member to the sleeve and the sleeve thermally couples the collet to the bracket when the collet is pressed into the sleeve.

12. The capacitor of claim 11 wherein the conductor member is configured to axially transfer heat from the film capacitor member to the collet.

13. The capacitor of claim 6 wherein the conductor member is made from a material having a thermal conductivity of greater than about 250 k–W/(m·K).

14. The capacitor of claim 13 wherein the material is aluminum or copper.

15. The capacitor of claim 6 wherein the conductor member is a heat pipe.

* * * * *